US009002952B2

(12) United States Patent
Kumpula et al.

(10) Patent No.: US 9,002,952 B2
(45) Date of Patent: Apr. 7, 2015

(54) MESSAGING SYSTEM, A MESSENGER SERVER, A METHOD AND A COMPUTER PROGRAM PRODUCT

(75) Inventors: Tuomas Kumpula, Tampere (FI); Hannu Kumpula, Tampere (FI)

(73) Assignee: Geniem Oy (FI)

( * ) Notice: Subject to any disclaimer, the term of this patent is extended or adjusted under 35 U.S.C. 154(b) by 897 days.

(21) Appl. No.: 12/483,409

(22) Filed: Jun. 12, 2009

(65) Prior Publication Data
US 2009/0319628 A1 Dec. 24, 2009

(30) Foreign Application Priority Data

Jun. 13, 2008 (FI) .................................... 20085582

(51) Int. Cl.
*G06F 15/16* (2006.01)
*H04L 12/58* (2006.01)

(52) U.S. Cl.
CPC .............. *H04L 12/58* (2013.01); *H04L 12/585* (2013.01)

(58) Field of Classification Search
USPC ......................................... 709/206, 217, 204
See application file for complete search history.

(56) References Cited

U.S. PATENT DOCUMENTS

| | | | | |
|---|---|---|---|---|
| 6,366,915 | B1* | 4/2002 | Rubert et al. ................. | 707/770 |
| 7,325,034 | B2* | 1/2008 | Douglis et al. ................ | 709/205 |
| 7,783,624 | B2* | 8/2010 | Martinez et al. .............. | 707/709 |
| 2001/0032240 | A1* | 10/2001 | Malone et al. ................ | 709/203 |
| 2002/0198962 | A1* | 12/2002 | Horn et al. .................... | 709/218 |
| 2003/0055903 | A1* | 3/2003 | Freed ............................. | 709/206 |
| 2003/0195837 | A1* | 10/2003 | Kostic et al. .................... | 705/37 |
| 2005/0004986 | A1* | 1/2005 | Aoki et al. .................... | 709/206 |
| 2005/0076087 | A1* | 4/2005 | Budd et al. .................... | 709/206 |
| 2005/0080863 | A1* | 4/2005 | Daniell ......................... | 709/206 |
| 2005/0198579 | A1* | 9/2005 | Perepa et al. ................. | 715/752 |
| 2005/0228860 | A1* | 10/2005 | Hamynen et al. ............. | 709/203 |
| 2006/0149819 | A1* | 7/2006 | Auhagen ....................... | 709/206 |
| 2006/0212523 | A1 | 9/2006 | Daniels et al. | |
| 2007/0005717 | A1* | 1/2007 | LeVasseur et al. ............ | 709/206 |
| 2007/0041359 | A1 | 2/2007 | Uecker | |

(Continued)

FOREIGN PATENT DOCUMENTS

| | | |
|---|---|---|
| WO | 0120855 A1 | 3/2001 |
| WO | 2005116882 A1 | 8/2005 |

OTHER PUBLICATIONS

European Office Action issued Jul. 14, 2010.

(Continued)

*Primary Examiner* — Backhean Tiv
(74) *Attorney, Agent, or Firm* — Perman & Green, LLP

(57) ABSTRACT

The present invention relates to a method for a messaging system, a messaging system, a messenger server and a computer program product. The messaging system comprises a messenger server, a sending client and at least one receiving client, and a data transfer network formed therein between. A message comprising at least a link to web content is created and sent from the sending client to at least one receiving client. The messaging system is configured to determine whether the said at least one receiving client has already received the message, and if not, to deliver an identification referring to the message to said at least one receiving client, and said at least one receiving client is configured to retrieve the message on the basis of the identification from the messenger server, whereby the messaging system is configured to automatically display the content in the message.

10 Claims, 9 Drawing Sheets

(56) References Cited

U.S. PATENT DOCUMENTS

| | | | |
|---|---|---|---|
| 2008/0065732 A1 | 3/2008 | Kulkarni et al. | |
| 2008/0133676 A1* | 6/2008 | Choisser et al. | 709/206 |
| 2008/0250332 A1* | 10/2008 | Farrell et al. | 715/753 |
| 2009/0031244 A1* | 1/2009 | Brezina et al. | 715/781 |
| 2009/0094602 A1* | 4/2009 | Ziskind et al. | 717/178 |
| 2009/0100062 A1* | 4/2009 | Fisher et al. | 707/10 |
| 2009/0216901 A1* | 8/2009 | Schloming | 709/237 |
| 2009/0234876 A1* | 9/2009 | Schigel et al. | 707/102 |
| 2009/0265607 A1* | 10/2009 | Raz et al. | 715/233 |
| 2009/0288150 A1* | 11/2009 | Toomim et al. | 726/5 |
| 2010/0325221 A1* | 12/2010 | Cohen et al. | 709/206 |
| 2011/0289011 A1* | 11/2011 | Hull et al. | 705/319 |

OTHER PUBLICATIONS

Arthur, Charles, XP-000863998, Is Snap Preview the most hated Web 2.0 function ever?, The Guardian, Thursday Feb. 22, 2007, Technology Guardian, United Kingdom.

http://blog.friendfeed.com/2007/11/my-new-status-message-i-love-friendfeed.html.

European Search Report Dated Sep. 15, 2009.

Lazyrussian Productions: "Email This Firefox Extension" [Online] Feb. 13, 2008, pp. 1-5, XP007909779.

Henric et al: "[MOD] Sender article link to yahoo messenger and email", SNEWS, [Online] Feb. 1, 2008, pp. 1-5, XP007909778.

* cited by examiner

Fig. 2

MESSAGING SYSTEM, A MESSENGER SERVER, A METHOD AND A COMPUTER PROGRAM PRODUCT

CROSS-REFERENCE TO RELATED APPLICATIONS

This application claims priority to Finnish patent application 20085582 filed Jun. 13, 2008, the disclosure of which is incorporated herein by reference.

FIELD OF THE INVENTION

This invention relates to a method, to a messenger server and to a computer program product wherein a message comprising at least a link to a web content is created and sent from a sending client to at least one receiving client.

BACKGROUND OF THE INVENTION

Internet is a global network that enables users to e.g. browse WWW-sites (World Wide Web, later "web"), send and receive emails and communicate with other users e.g. by instant messaging. When a user browses web-sites (s)he may find content that (s)he wishes to share with a friend group or a community (s)he belongs to. One method for sharing content is to bookmark the web-site into a social bookmarking service. However, in order to look at the bookmark, other users need to be notified by an email, an instant message or similar existing system to go to the bookmark site. After the user has found the bookmark, (s)he has to click it for accessing the actual content. Another method for sharing content is to send a link to the web content via email, which clutters the mail box and again requires the user to click the link in order to see the desired content. Discussion on the content via email is neither practical.

Currently users' emails are polluted with these links and often users wouldn't like to receive them, even though they were interested in the content itself.

Similar situation occurs e.g. with web based social communities like Facebook© comprising message boards. In such a community users may send messages to friend groups or selected friends. However, the same message may be received for many times by one user which causes filling up of user's message board. This requires extra work from the user to clean up the message board from duplicate messages.

Instant messaging provides a way of sending electronic messages between users substantially in real-time. What differentiates instant messaging from emails, is that instant messaging usually occurs between users sitting at the same time at their computers (i.e. face-to-face communication via computers) whereas emails are send between users and no immediate response is expected.

In conventional messaging systems received messages can be forwarded to a group of friends. In a typical situation an email client receives a message from an email server using POP3 (Post Office Protocol) protocol and then forwards the message to one or more other email clients using SMTP (Simple Mail Transfer Protocol) protocol.

Although SMTP protocol provides means for forwarding messages to client groups, existing systems have number of drawbacks. One problem relates to a situation where a message is forwarded to several groups, and one of the clients belongs to more than one group. In this situation the client in question receives the same message as many times as there are groups (s)he belongs to. This not only fills up the messaging application of the client, but also may annoy the client that much that (s)he may eventually block the senders of the message as the messages are marked as spam when they are repeated.

Another problem relates to information on the route and the originator of the message. Existing systems insert information on the route of the message (e.g. who received the message before it arrived to a certain client) into the message itself. The route information is written in the message and therefore it is possible to be deleted by anyone forwarding the message. The content of the message can also be altered by anyone in the forwarding chain. This makes tracking of the originator of the message, tracking the route of the message and determining the originality of the message difficult or even impossible. In addition, email is a passive medium which means that the sender does not know how many receivers actually took the time to view the link and was the message delivered at the first place.

Therefore what is needed is an alternative way for sharing web content and handling message forwarding, which takes into account the aforementioned challenges. This application is addressed to such needs.

SUMMARY OF THE INVENTION

It is an aim of the present invention to provide a method for a messaging system, a messaging system, a messenger server and a computer program product. The messaging system comprises a messenger server, a sending client and at least one receiving client, and a data transfer network formed therein between. A message comprising at least a link to web content is created and sent from the sending client to at least one receiving client.

According to one example of the invention the method comprises determining whether the said at least one receiving client has already received the message, and if not, delivering an identification referring to the message to said at least one receiving client, retrieving the message on the basis of the identification from the messenger server, and automatically displaying the content in the message.

According to yet one other example of the invention, the messenger server is configured to determine whether the said at least one receiving client has already received the message, and if not, to deliver an identification referring to the message to said at least one receiving client, and to retrieve the message to said at least one receiving client on the basis of the identification received from said at least one receiving client, and to automatically display the content in the message.

According to yet another example of the invention, the computer program product comprises instructions being configured, when run on the computer, to implement the aforementioned method.

The present application relates to a messaging system which enables selecting content from a web-site and sending a message displaying the content to one or more recipients. The messaging system also makes it possible to forward the message further to one or more recipients and to identify whether some of the recipients have already received the message in question. In such a situation, these recipients are automatically deleted from the recipient list so that they will not receive the same messages over and over again.

One example of the message comprises a link to the selected content and message identification that distinguishes the message in a messenger server. However, when such a message is received, the recipient is displayed, not the link, but the actual content in the message. The messaging system is thus capable of displaying the content in the message instead of the link. The content is loaded from its actual location in the internet and not stored in the messaging system.

DESCRIPTION OF THE DRAWINGS

In the following the invention will be described in more detail with reference to the appended drawings, in which FIG. 2 illustrates an example of launching a messenger on a web site.

DETAILED DESCRIPTION OF THE INVENTION

The present invention relates to a messaging system, where a message is transmitted to a group of clients (formed of one or more group members) and then may be retransmitted to another group of clients (formed of one or more group members) so that no client receives the same message more than one time while tracking the messaging route. The messaging system can be an instant messaging system, but teachings of the messaging system may also be utilized with email messaging and web-based message boards.

Figure 1:
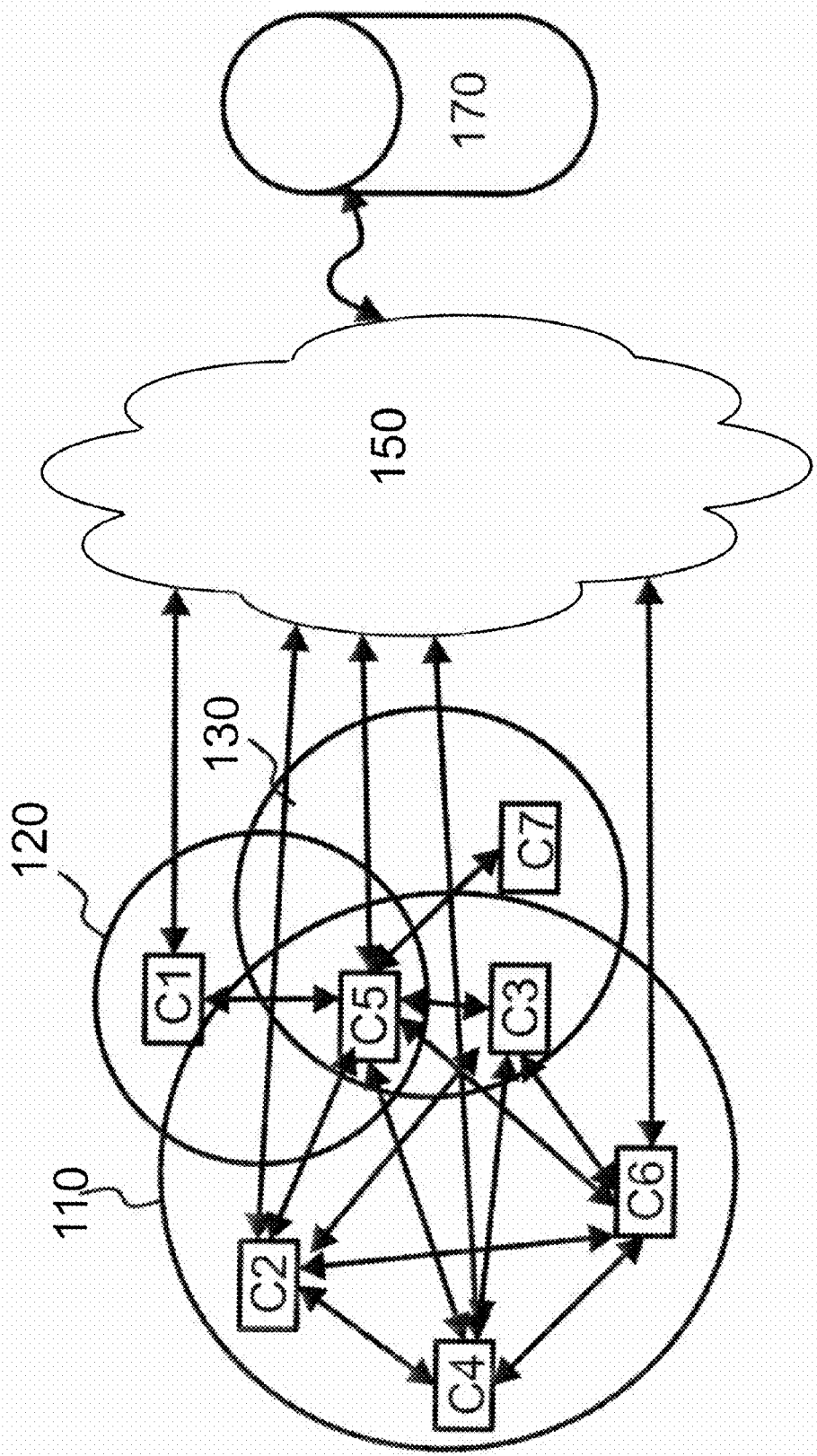
FIG. 1 illustrates an example of a configuration of the system.

FIG. 1 presents an example of a messaging system. Components C1-C7 of FIG. 1 represent client applications (later "clients") that are configured to belong to groups 110, 120, 130. It can be seen that clients C1 and C5 belong to group 110, clients C5, C3 and C7 belong to group 130, whereas clients C2, C3, C4, C5 and C6 belong to group 110. Network 150 provides a channel to clients to communicate with each others and with a messenger server 170. Network can be either wired or wireless data transfer network. The multiple arrows in FIG. 1 represent the communication connections between clients and the server 170. What should be noticed here is that in FIG. 1 the clients of the same group can communicate with each other. This is because the present invention mainly relates to sending messages to client groups to which the client belongs. However, it may be possible that in some situations the client may send messages to other groups as well.

The client application is stored in user equipment by means of which the messaging is performed. The user equipment (also referred as "device") can be a personal computer, a laptop computer, a personal digital assistant, a cellular telephone, a communicator or a similar electronic device being capable of IP communications (Internet Protocol). The receiving device and the sending device do not need necessarily be of the same type. A message to be sent can be of any suitable form which can be received by a client via existing data networks. A typical form of message is text, www link, image, audio or video. Term "messenger" is used in the disclosure to refer the messaging system according to the invention.

The messenger according to the present invention is a viral messaging application that allows sharing web content with friends (i.e. group members) instantly, chatting about the content and resending the received content to other friends (i.e. in other group). The messenger can be an instant push messenger which means that it may instantly pop-up the message in the receiving device. The messenger comprises at least an image and video wrapper, but the messenger may also comprise a mobile profile and/or message tracker. The messenger client application is stored in the user equipment, wherefrom it can be launched according to examples that will follow.

The image and video wrapper of the messenger are configured to display the shared content (e.g. an image that has been sent by the messenger) on the message, even though the actual content file remains on its original location in the internet. The message tracker allows tracking the route of resent messages, thus enabling in-depth collection of statistics of who are the main users, how the messages are sent, received and especially resent. The mobile profile makes it possible to interchange the user equipment from computer to e.g. cellular telephone.

Sending Messages

Figure 3:
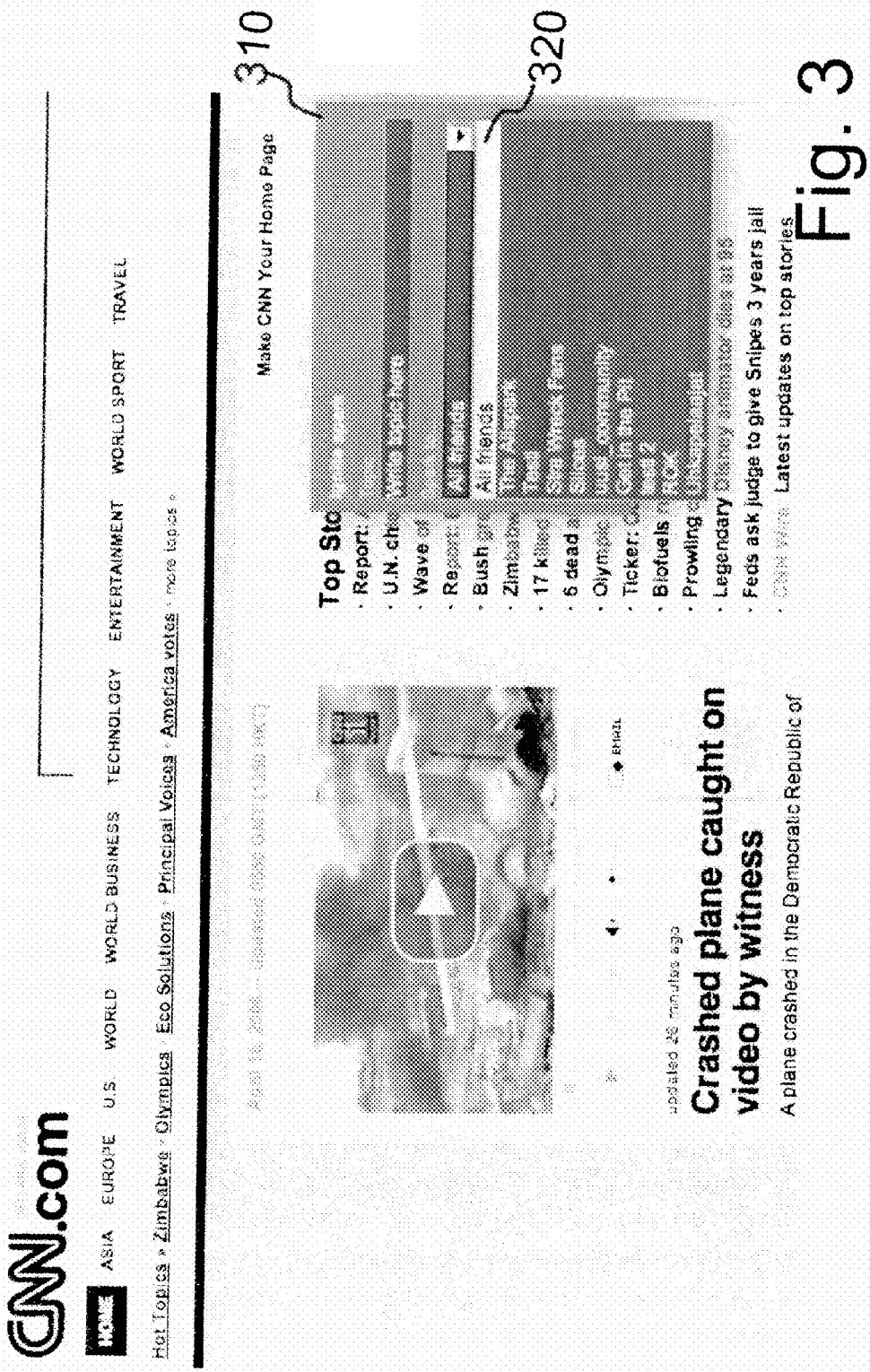
FIG. 3 illustrates an example of sending a message concerning a web site.

FIG. 2 is an illustration of how web content on a web-site 200 can be sent by using the messenger according to one example of the invention. While browsing in the web, the user may arrive to a web-site 200 the content of which (s)he considers interesting to her/his friend group. In order to notify such a group of the content by the messenger, the user has to launch the messenger application. This can be done e.g. by clicking the right button of the mouse on top of the web site 200. The clicking causes opening of a menu view 210 comprising one or more selection options. One of this selection options corresponds to a messenger function and it can be indicated e.g. with a certain character string such as "Ignite Spark" 220. It is appreciated that any other character string indicating the messenger function can be used. Selecting this option prompts the user a messenger pop-up window where the user can select to which friend group(s) the message will be sent. FIG. 3 illustrates an example of the messenger pop-up window 310 displaying a list of selectable friend groups 320.

It should be noticed at this point that term "clicking" refers to a usage of e.g. a mouse by means of which a certain function can be performed. However, mouses or corresponding control devices cannot be used with some user equipments whereupon clicking may not be possible. Therefore other interaction methods are appreciated as well. Because of this, term "click" should be interpreted widely enough to include the other interaction and selection methods (e.g. scrolling the menu with dedicated keys or buttons and selecting an option with other key or button) throughout this document. For example, certain key combinations or pointing by a stylus can provide the same effect as clicking with a mouse.

After one or more receiving groups have been selected, the message will be delivered instantly to all the users belonging to the receiving groups. The same message is thus sent to multiple people at the same time. It is realized that in some situation the message can be sent to a single person as well.

As an example, the user may have a group of 67 people in the "Astrology" group. All people who have joined this group are interested in sharing and receiving any content relating to the astrology. The link of an interesting web site is therefore sent instantly to the 67 users who can look the content that was first found by one of the group members who considered the content worth sharing.

Figure 4:
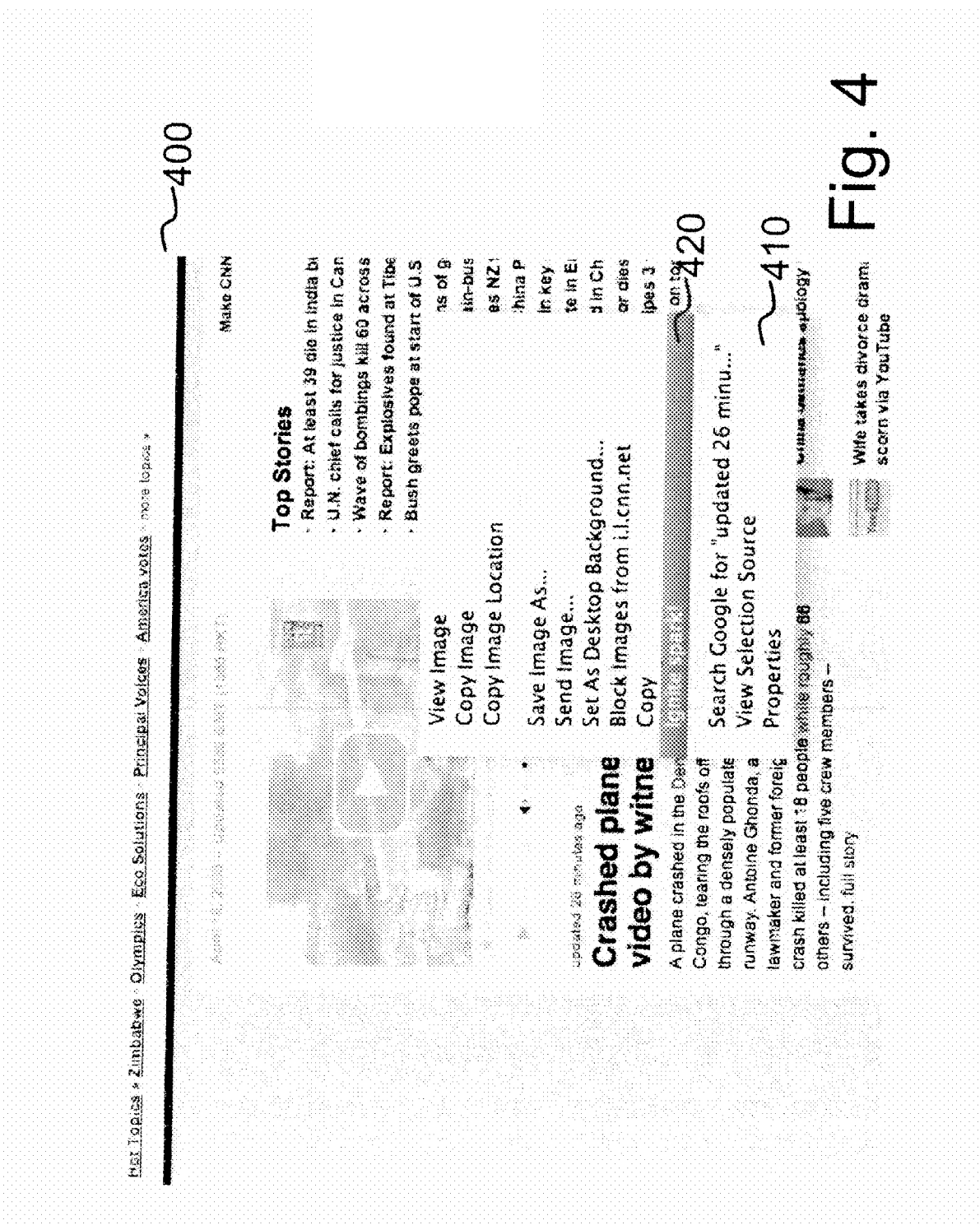
FIG. 4 illustrates another example of launching a messenger on a web site.

FIG. 4 illustrates another way of selecting web content 405 to be sent from a web-site 400. In FIG. 4, the user has painted (selected with a cursor) a desired piece of content 405 from the web-site 400 and then opened a menu view 410 wherefrom a messenger option 420 can be selected. The piece of content may be e.g. an image, a piece of text, video or audio. When the piece of content comprises text, the text is actually cloned to the server for messaging purposes. This means that if the text is modified in the web-site, the text in the message remains the same. However, when e.g. an image or a video or any other binary coded data is selected for the message, such content is retrieved from its actual location to the message. This means that when the original content is modified or removed, the content in the message is modified or removed as well. Even though the text is cloned to the server, no recipient can modify or delete it. Similarly no recipient can modify or delete any binary coded data being displayed in the message. As said, the message can comprise a link to an image, a video, an audio, a binary data and text. It should be noticed that the message is not limited to only one link and text, but one or more or all the mentioned media can be included in one message.

The messenger application wraps the selected content into the message. In addition to the selected content, a source link can be embedded to the message for copyright reasons and for allowing the receiver to go and see the original source if desired. In relation to FIG. 4, term "painted" has been used for describing a certain selection method. Painting refers to usage of a mouse or similar control device, by means of which partial content may be selected. However, skilled person will appreciate that mouse or similar control device is not necessary in order to perform "painting". For example different key combinations (e.g. shift+arrow keys) may also result in similar painting result.

In the above a message creation comprises selecting content on a web-site. However, it is appreciated that the message can also be created manually from the messenger software in the PC application (Personal Computer), the messenger web-site or in the plug-in software. In such a case, the user has to type the text and/or a link manually or use a clipboard function of the user equipment.

Receiving Messages

Figure 5:
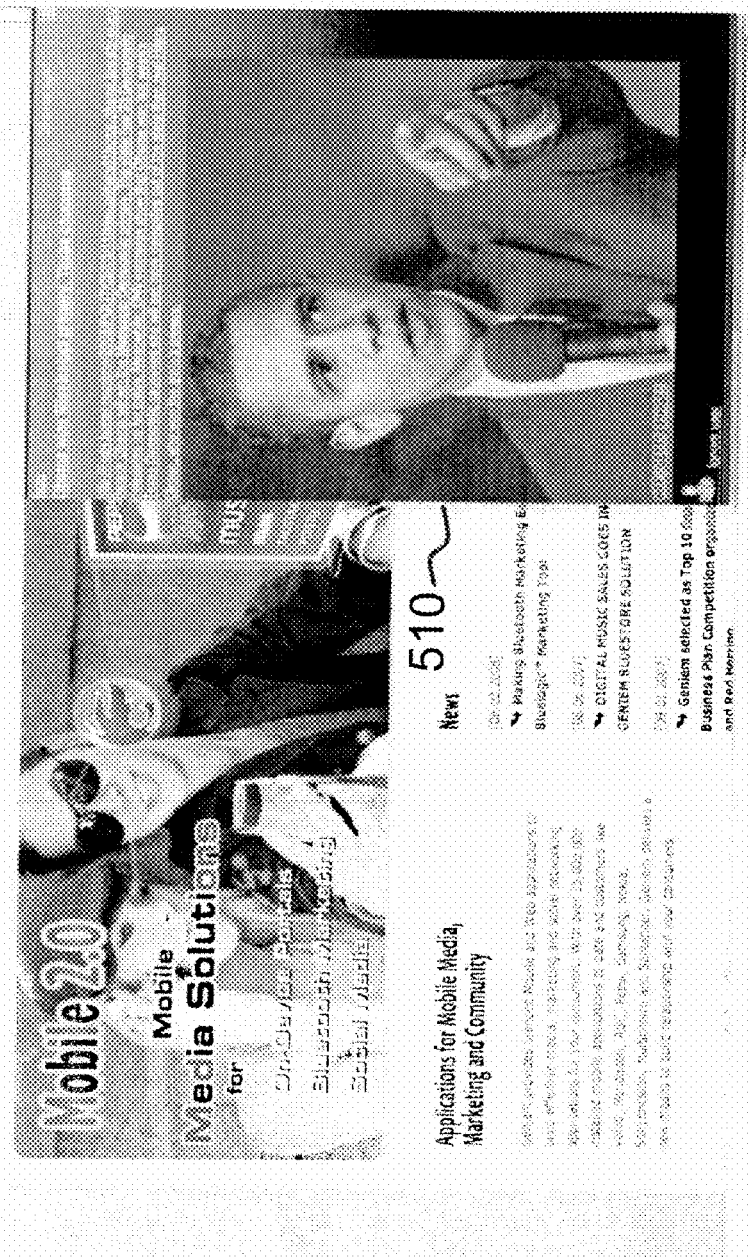
FIG. 5 illustrates an example of receiving a message.

When a user receives a message, (s)he may be automatically logged into the messenger service by the messenger application. This has been illustrated by FIG. 5. The application can be a web browser (Firefox, Explorer, Safari) plug-in or native PC application (Vista, XP, Mac). In the first case, the user can be logged into the messenger service as the browser is opened (at any page) and in latter case when the computer is opened. The selection between web browser and native PC application is made at the time the user installs the messenger application: If native PC application is installed, opening computer can make him/her logged in and if a browser/other plug-in messenger application is installed, opening the parent application (e.g. browser) may login the user. Once the user gets the message, the application pops-up a notification window 510 and can show a part of the message in this. User may click the pop-up in order to open the messenger web site or the messenger application depending on the used interface. It is realized that this kind of solution delivers messages instantly to the user without polluting user's mailbox.

When a user receives a link to an image on a web site, the image wrapper component of the messenger application is able not just to show the link of the web site, but to wrap the image into the message. The image file itself, however, is not stored in the message, only the link.

Figure 6:
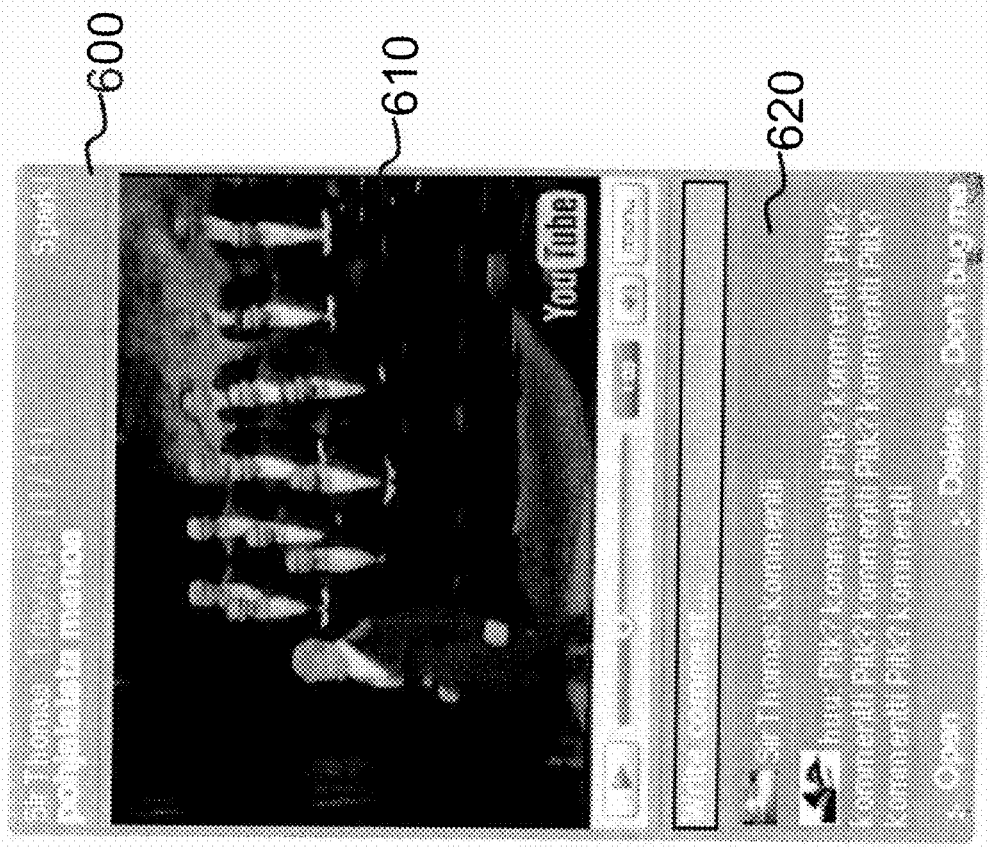
FIG. 6 illustrates an example of receiving a message displaying video content.

When a user receives a link to a video on a web site (e.g. a Youtube video web site), a video wrapper component of the messenger application automatically plays the video in the messenger instead of just showing the link for user to click. FIG. 6 illustrates a message with a video wrapped therein. It can also be seen from FIG. 6 that after receiving a message, the user may instantly start chatting on the message in the messenger window 600. The messenger window 600 comprises a field 610 for the image (or video) and a field 620 for discussion The user may activate a mobile profile by adding cellular telephone number to the user settings of the application. The mobile profile is automatically activated if the user is not logged into the computer. If the user gets a link to a message and log in status is "not logged in", the link may be delivered as WAP (Wireless Application Protocol) push message to the user. When the link is opened, an inbox comprising the message is displayed to the user.

When the user desires to use mobile device for watching the content, it is possible to convert the original content in real-time or to store the converted version to the server at the time the link is send. It is also possible to send new content to the server from the mobile device and share it substantially instantly by means of a message. This basically resembles the situation where existing content is shared, but in this the content is created to the server before sharing. If this content is then modified or deleted, it is also modified or deleted from the message, as well as other shared content.

It is also possible to generate or obtain from the server of the original content a preview image for a mobile device, especially in such a case, where image/video/audio/binary coded data cannot be displayed properly because of relatively small display compared to a display of e.g. a computer.

Message Routing System

Once the user creates the message in the messaging system according to the invention, the message is actually created to the messenger server (170 in FIG. 1) with unique message identification (later "ID"). Because of this the messenger system does not resemble email, where the message and all its content (e.g. attached images) are sent in the message. In the present invention, the message itself does not store the content (web links content, video content, image content), it only stores the link to the content. For example, the link http://www.weather.fi/weather-map.jpg stores the image of a weather-map in the internet. When the user executes the messenger application, e.g. by clicking "Ignite spark" (or any character string indicating the messenger function) on top of the image, and creates a message on the image, the message gets a unique message ID, by means of which the message can be found from the messaging system, e.g. http://dev.geniem-.com/wf/sparkComment/311, where "311" stands for the unique message ID. The image itself is not stored in the message, only the link, but when viewed, the messenger is capable of displaying the image on the weather-map instead of just showing the link.

The message is located in one place only and all the receiving devices receive a link pointing to this message. The messenger is needed to fetch the message data from the location and to show it to the user in its actual form. If the original file (image, video, web site) is removed, the message will be empty.

Figure 7:
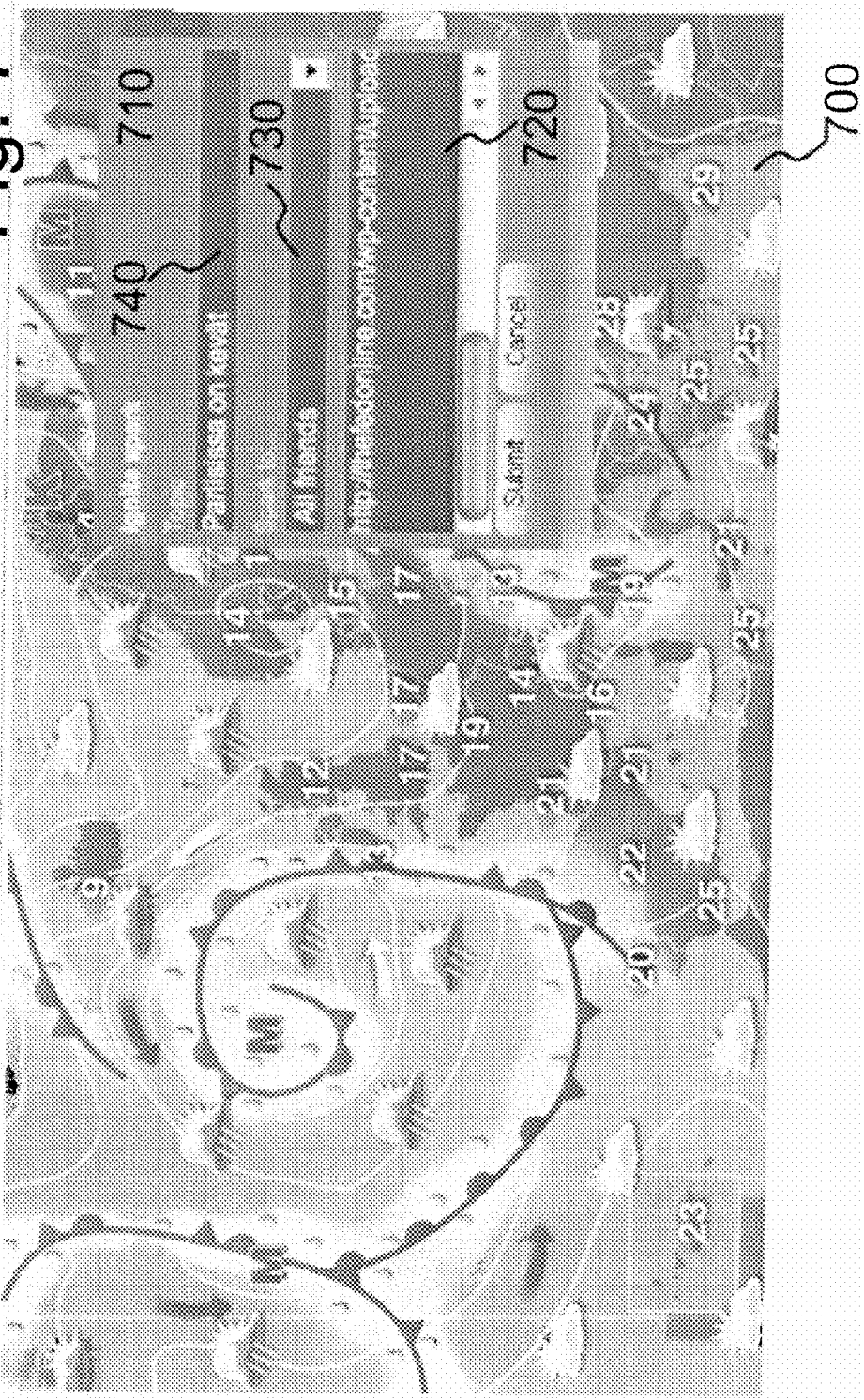
FIG. 7 illustrates an example of forming a message having an image.
Figure 8:
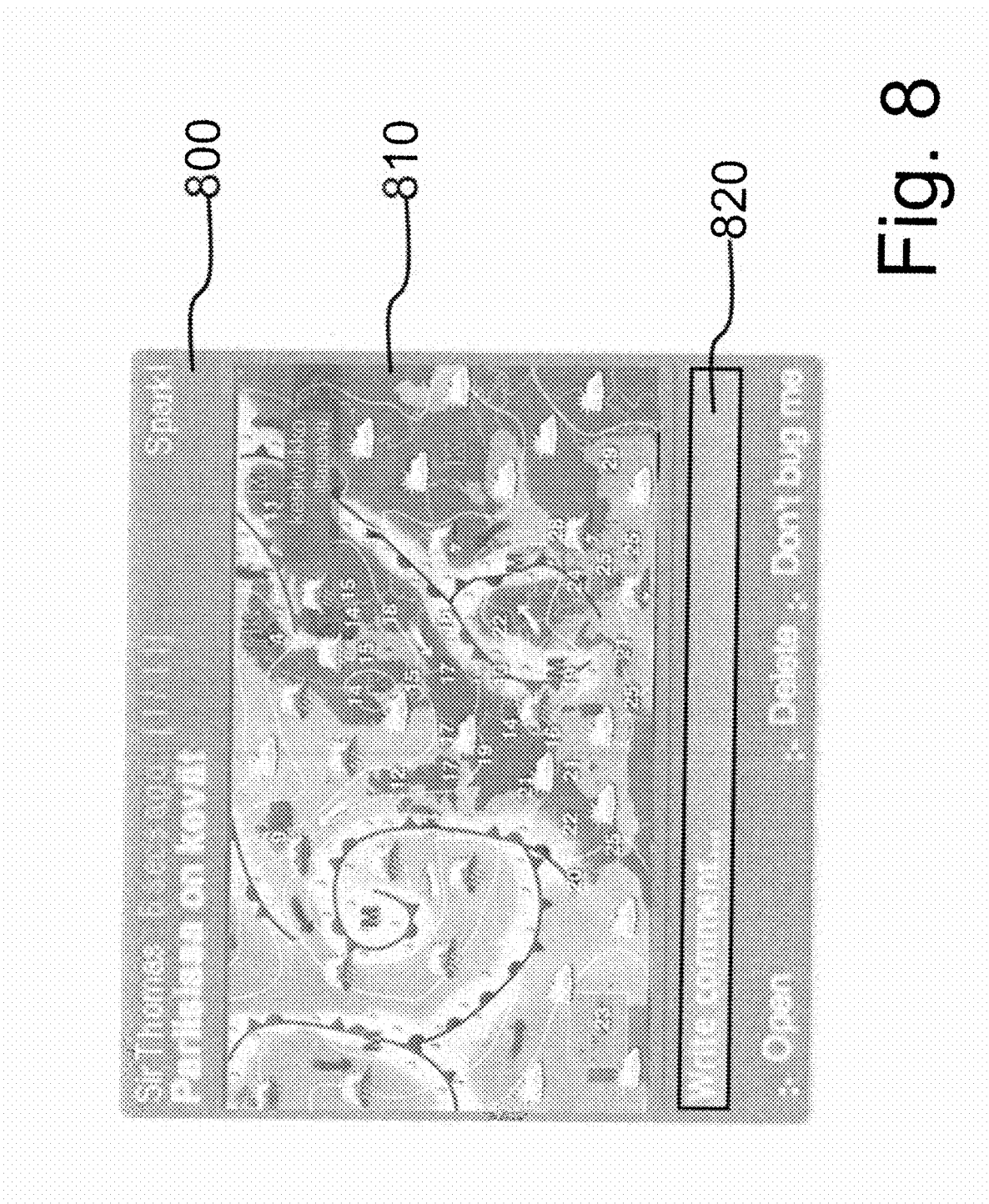
FIG. 8 illustrates an example of displaying a message having an image.

FIGS. 7 and 8 illustrate a process for creating a message as described above. An image 700 on a web site is wanted to be shared with a group. The messenger is executed, whereby the messenger window 710 is opened. The messenger window 710 comprises a topic field 740 defining a subject for the message, a field for recipients 730 and a field for the link to the desired image 720. After receiving the message, the receiving user is shown a message window 800 comprising the image 810 and a field for comments 820. The message can be defined as private message, whereby it can be seen only by the clients who received the message. However, non-private messages, e.g. the messages being the most popular (i.e. most resent messages), may be listed in the messenger web-site, and can thus be seen by anyone visiting the web-site.

Viral Messaging, i.e. Resending Messages

The messenger according to the present invention is able to resend (forward) the messages. To clarify term "resend" in relation to the present invention a following example is presented. User A receives a message from a user B. The user B has also sent the message to users C, D, E, F, G, H. The user A wants to resend the message to her/his friends G, H, I, J, K, L, M, and for doing that, the user selects the resend function in the message. The messaging system automatically notices that the users G and H, have already received the message from the user B, and therefore takes away duplicates, i.e. users G and H. The message from the user A is thus sent only to the users I, J, K, L, M.

Unlike email that provides a forward function where the forwarded message is a copy and may be altered from the original message, the messages of the present invention cannot be modified. The receivers are sent exactly the same message, because—as said—technically they are sent the ID to the message, e.g. http://dev.geniem.com/wf/sparkComment/311 and the messenger takes care of presenting the message to the user.

If the message has comments, the receiver will always see the latest ones in the message.

Figure 9:
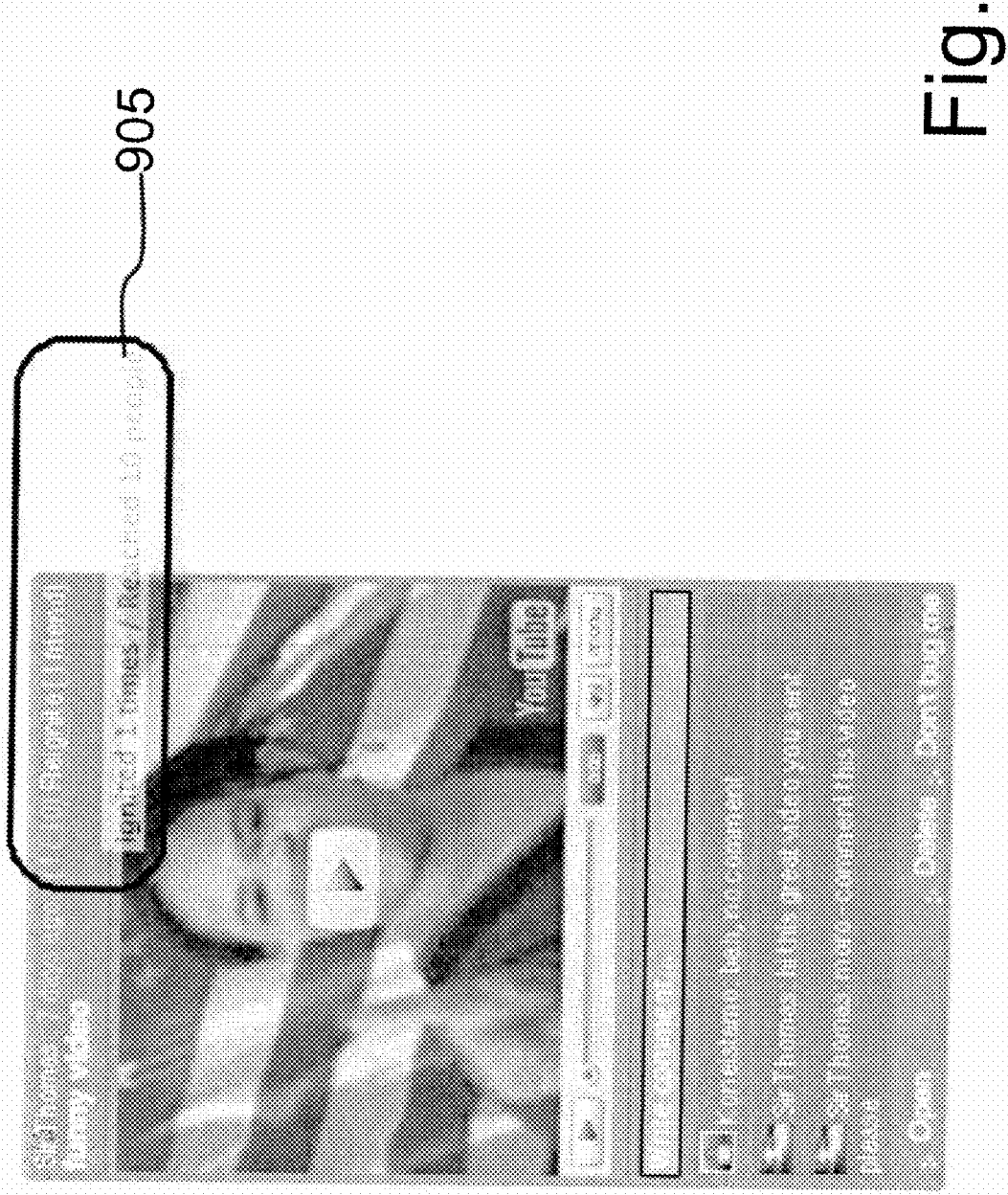
FIG. 9 illustrates an example of tracking a message.

As mentioned earlier, the messaging system may also include a message tracker inside each message that is configured to show each user how many times the message has been sent, how many users it has reached and if resent, how many users it would reach more after taking away the duplicates (905 in FIG. 9). Also the geographical route of the message can be tracked. In addition the most popular messages can be read from the messenger by selecting "Top messages".

By allowing users to virally send and resend messages, the messaging system can collect valuable information of who are the most active users, how the viral networks are built and what is needed for a message to reach "tipping point", to become a phenomenon. This information may then be utilized for advertising purposes.

Other Functions of the Messaging System

The messenger also provides a live state for displaying the latest messages being sent or received. These message categories can be differentiated with colours, e.g. received messages are blue, whereas sent messages are red in colour. It will be appreciated that other differentiating methods may be used, e.g. different font size, different font type, etc. Messages that have not be read yet, can also be shown with e.g. different colour until the message is read or until all are marked as read. It will be appreciated that other indication methods than colours can be used as well. The messages can be browsed e.g. by arrow keys. Each message can be commented by typing a comment to the field "Type your comment here" in the message.

When a user has typed a comment to a message, the message is also opened on a discussion board. The user may go to the board by selecting "discussion" option from the message. The number of messages having comments may be displayed between brackets. The message can be closed from the discussion board by selecting "close" in the message or "close all".

Selection "open" opens the message to a larger window. Selection "delete" erases the message from recipient's message list and message box. The user may also block messages from a certain sender by selecting "block messages" on top of the sender in question in the friend list. The blocking may be reversed by selecting "allow messages" on the sender in the friend list. It is further possible to set a feature in the messenger, by means of which message is not opened to discussion board even if new comments are received. This setting is "remove notification" that can be selected, e.g. when the user does not want to follow a certain discussion.

It is appreciated that abovementioned texts concerning the user interaction or asking user's input, may vary. Therefore, e.g. text strings "delete" and "block messages" should not be considered as limitations for the present invention.

In previous the messaging system of the present invention has been disclosed. The skilled person will appreciate that the detailed description has been given for better understanding of the invention, and some of the features (e.g. user interface, selection commands, system configuration, interaction means) may vary depending on the user equipment and possible other functionalities that are incorporated with the messaging system. Therefore it will be evident that various modifications may be made within the scope of the invention.

The invention claimed is:

1. A method for a messaging system in a web-based social community, said messaging system comprising a messenger server, a sending client and at least one receiving client and a data transfer network formed therein between, wherein the method comprises:

receiving a message sharing request from said sending client with said at least one receiving client, said message comprising at least a link to web content, wherein said message is assigned an identification, storing tracking information relating to said at least one receiving client for the message, as a response to said message sharing request, sharing the message, wherein the sharing comprises:

determining by means of the tracking information which receiving client of said at least one receiving client has already received the identification referring to the message; and delivering the identification referring to said message to such receiving client that has not received the identification referring to said message and not delivering the identification referring to said message to such receiving client that has received the identification referring to said message;

on the basis of the identification, retrieving the message from the messenger server to said at least one receiving client, and automatically displaying the web content in the message without storing the web content in the message.

2. The method according to claim 1, further comprising creating the message in the messenger server.

3. The method according to claim 1, wherein the web content comprises one or more of text, image, audio, or video content.

4. The method according to claim 3, further comprising displaying the one or more of image, video, or audio content in the message instead of displaying the link to the web content.

5. A messenger server for a web-based social community comprising a data transfer network to at least a sending client and to at least one receiving client, said messenger server being configured to:

receive a message sharing request from said sending client with said at least one receiving device, said message comprising at least a link to web content, wherein said message is assigned an identification, and store tracking information relating to said at least one receiving client for the message, as a response to said message sharing request, the messenger server is further configured to share the message by:

determining, by means of the tracking information, which receiving client of said at least one receiving client has already received the identification referring to said message, and delivering the identification referring to the message to such receiving client that has not received the identification referring to said message and not to deliver the identification referring to said message to such receiving client that has received the identification referring to said message;

retrieve the message on the basis of the identification to said at least one receiving client, and automatically display the web content pointed to by the link in the message without storing the web content in the message.

6. The messenger server according to claim 5, wherein the web content comprises one or more of text, image, audio, or video content.

7. The messenger server according to claim 6, further comprising a wrapper for displaying the image or video or audio content in the message instead of displaying the link to the web content.

8. The messenger server according to claim 5, being configured as a messaging system further comprising a sending client and at least one receiving client.

9. The messenger server according to claim 5, wherein said sending client and said at least one receiving client are one of the following group: a personal computer, a laptop, a cellular phone or a personal digital assistant.

10. A non-transitory computer program product for a messaging system in a web-based social community, said computer program product comprising instructions being configured, when run on a computer, to:

receive a message sharing request from a sending client with at least one receiving client, share a message comprising at least a link to a web content with said at least one receiving client, wherein said message is assigned an identification, store tracking information relating to said at least one receiving client for the message, and as a response to said message sharing request, sharing the message by:

determining by means of the tracking information which receiving client of said at least one receiving client has already received the identification referring to said message, and delivering the identification referring to said message to such receiving client that has not yet received the identification referring to said message, and not delivering the identification referring to said message to such receiving client that has received the identification referring to said message, retrieving the message on the basis of the identification from the messenger server to said at least one receiving client, and automatically displaying the web content in the message without storing the web content in the message.

* * * * *